(12) United States Patent
Miller et al.

(10) Patent No.: US 6,295,879 B1
(45) Date of Patent: Oct. 2, 2001

(54) TORQUE SENSING APPARATUS FOR AN ELECTRIC ASSIST STEERING SYSTEM

(75) Inventors: Joseph D. Miller, Farmington Hills; Don Blandino; Michael J. Medora, both of Sterling Heights, all of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/264,204

(22) Filed: Mar. 8, 1999

(51) Int. Cl.[7] ................................................. G01L 3/00
(52) U.S. Cl. ........................................ 73/862.08; 180/444
(58) Field of Search ........................ 180/444; 73/862.08, 73/862.331, 862.332, 862.333

(56) References Cited

U.S. PATENT DOCUMENTS

| | | | |
|---|---|---|---|
| 4,415,054 | 11/1983 | Drutchas | 180/444 |
| 4,598,787 | 7/1986 | Drutchas | 180/444 |
| 4,800,974 | 1/1989 | Wand et al. | 180/444 |
| 4,986,380 | 1/1991 | Morishita | 180/444 |
| 5,020,616 * | 6/1991 | Yagi et al. | 180/444 |
| 5,039,926 | 8/1991 | Morishita et al. | 180/444 |
| 5,257,828 | 11/1993 | Miller et al. | 180/444 |
| 5,442,956 | 8/1995 | Persson . | |
| 5,623,409 * | 4/1997 | Miller | 364/999.999 |

\* cited by examiner

Primary Examiner—Benjamin R. Fuller
Assistant Examiner—Andre Allen
(74) Attorney, Agent, or Firm—Tarolli, Sundheim, Covell, Tummino & Szabo L.L.P.

(57) ABSTRACT

A torque sensing apparatus (30) includes first and second sensor elements (62, 70; 66, 74) which are substantially diametrically opposed relative to a central axis extending between the first and second sensor elements. Each of the sensor elements (62, 70; 66, 74) is operative to provide an electrical signal (34) that varies as a function of the relative position between first and second parts of the respective sensor elements. The electrical signals (34) of the first and second sensor elements (62, 70; 66, 74) vary in inverse relationship in response to non-rotational relative movement between the first and second parts of the respective sensor elements.

30 Claims, 4 Drawing Sheets

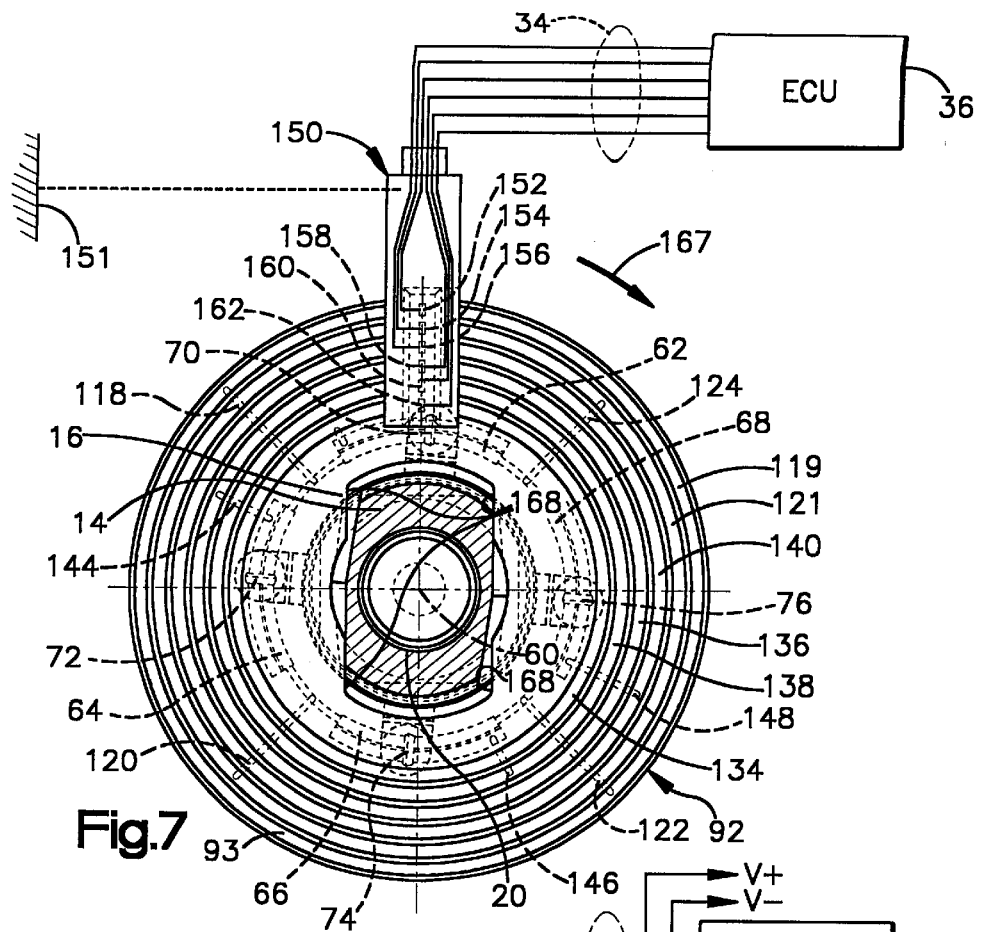
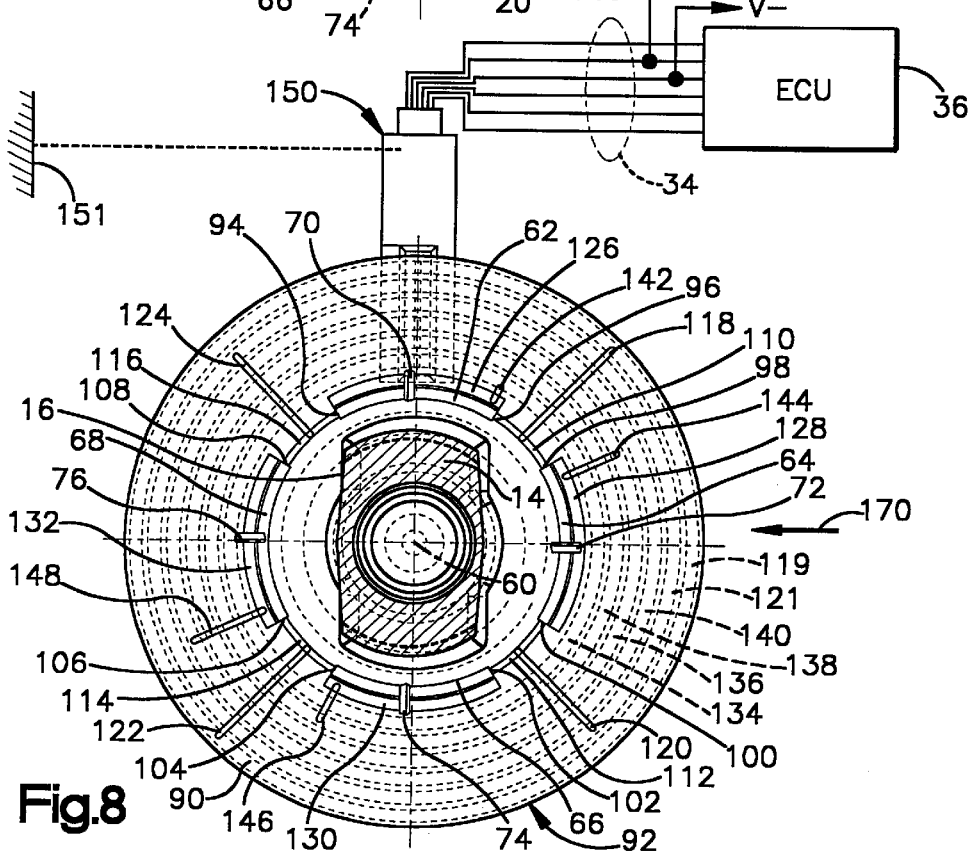

TORQUE SENSING APPARATUS FOR AN ELECTRIC ASSIST STEERING SYSTEM

TECHNICAL FIELD

The present invention relates to a torque sensing apparatus and, more particularly, to a torque sensing apparatus which is operative to compensate for the effects of non-rotational torque between an input shaft and an output shaft.

BACKGROUND OF THE INVENTION

A torque sensing apparatus is used in a steering system having electrically controlled power assist to detect an applied input torque, i.e., steering torque. Such power assist steering systems include either an electric assist motor, an electrically driven pump, or an electrically controlled solenoid valve. Typically, the torque sensing apparatus is connected between an input shaft connected to a steering wheel and a pinion or output shaft. The detected torque is used to control an assist electric motor, an electrically driven pump, or a solenoid valve in response to a driver's input torque applied to a vehicle steering wheel.

One type of torque sensor for use in steering systems includes a Hall-effect position sensor, such as is disclosed in U.S. Pat. No. 4,415,054 to Drutchas, which is assigned to TRW, Inc. A magnet is positioned on one shaft adjacent and rotatable relative to the Hall-effect sensor on the other shaft. The Hall-effect sensor measures the relative rotation between the input and pinion shafts and, in turn, the amount of twist in a torsion bar operatively connected between the input shaft and the pinion shaft. The output voltage of the Hall-effect sensor varies as a function of the relative position of the magnet to the sensor and, in turn, the amount of applied steering or input torque.

Another type of torque sensor is disclosed in U.S. Pat. No. 5,442,956 to Persson, which is assigned to TRW Inc. This torque sensor includes a rotary input transformer having a stationery primary winding and a rotatable secondary winding. Relative rotation between the input shaft and the pinion shaft results in corresponding relative rotation between the primary and secondary windings. The windings provide an output signal that varies as a function of their relative rotational position, thus providing an indication of the applied input torque.

Another type of torque sensing apparatus is disclosed in U.S. Pat. No. 5,039,926. In this patent, each of a pair of sensor elements provides an output signal to a torque displacement converter. The output signals represent steering torque applied to a steering wheel. Each output signal is monitored so that, upon detecting a predetermined difference between the signals, a fail safe relay is activated to deenergize an electric steering assist motor.

U.S. Pat. No. 4,986,380 discloses a torque sensor that includes a right turn sensor element and a left turn sensor element that generate an associated output voltage signal corresponding to the steering torque during a right turn or left turn, respectively. A motor controller prevents the flow of motor current when both of the sensor elements generate an output voltage at the same time.

U.S. Pat. No. 4,598,787, which is assigned to TRW Inc., discloses a torque sensor that includes a sensor element having a resistive strip operatively connected with the pinion shaft and an arm associated with the input shaft. Upon applying a predetermined amount of steering force, the sensor element provides an output signal that varies as a function of the relative rotation between an input shaft and a pinion shaft.

SUMMARY OF THE INVENTION

The present invention is directed to a torque sensing apparatus that includes a first sensor element having a first part which is connectable to an input shaft. The first sensor element also includes a second part adjacent and movable relative to the first part of the first sensor element and connectable to an output shaft. The first sensor element is operative to provide an electrical signal that varies as a function of the relative position between the first and second parts of the first sensor element. The torque sensing apparatus also includes a second sensor element having a first part connectable to the input shaft and a second part adjacent and movable relative to the first part of the second sensor element and connected with the output shaft. The second sensor element is substantially diametrically opposed from the first sensor element relative to a central axis extending between the first and second sensor elements. The second sensor element is operative to provide an electrical signal which varies as a function of the relative position between the first and second parts of the second sensor element. The electrical signals of the first and second sensor elements vary in inverse relationship in response to non-rotational relative movement between the first parts and the respective second parts of the first and second sensor elements.

BRIEF DESCRIPTION OF THE DRAWINGS

The foregoing and other features and advantages of the present invention will become apparent to those skilled in the art to which the present invention relates upon reading the following description with reference to the accompanying drawings, wherein:

FIG. 7 is a sectional view similar to FIG. 6 and illustrating a second condition; and FIG. 8 is a sectional view similar to FIG. 4, illustrating a third condition.

DESCRIPTION OF A PREFERRED EMBODIMENT

Figure 1:
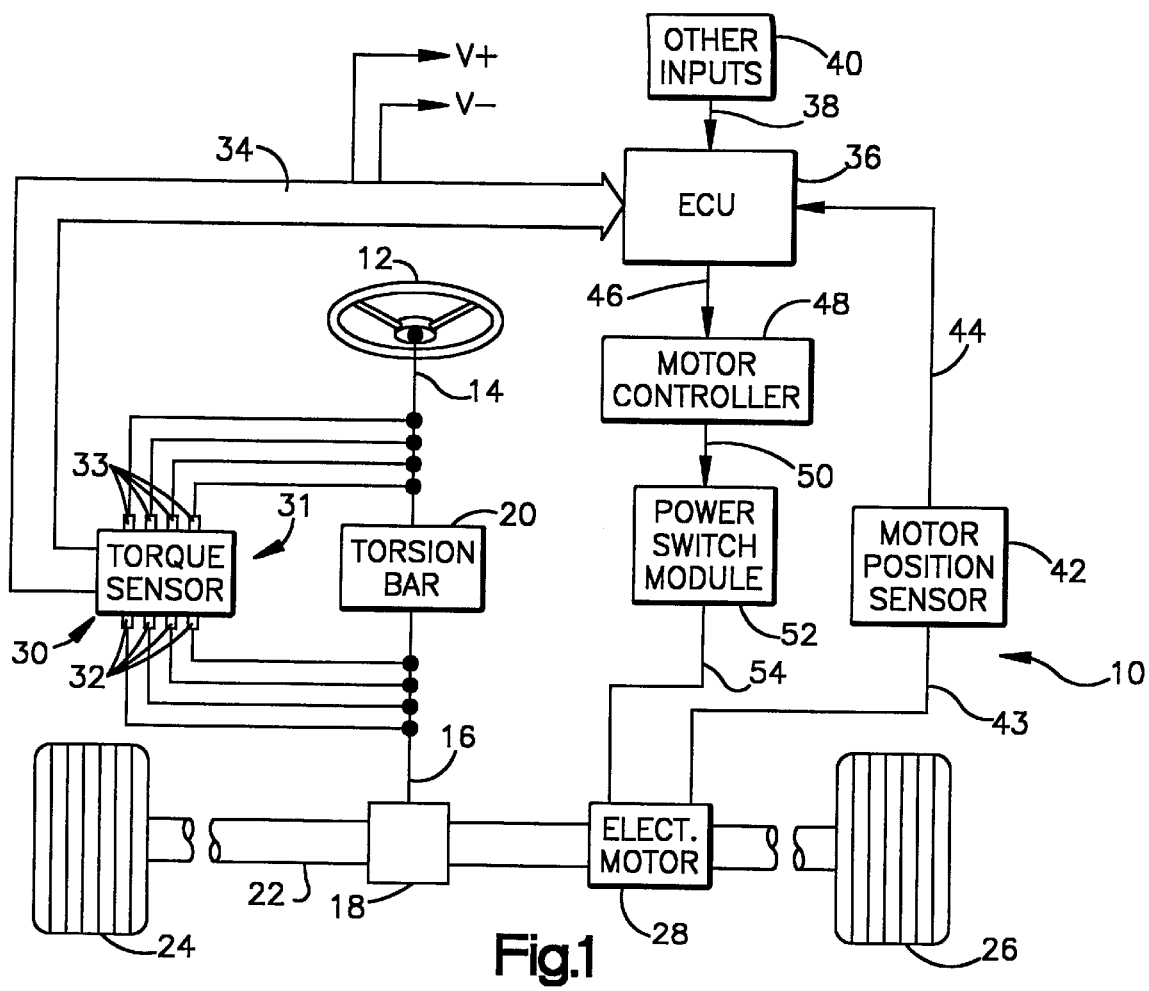
FIG. 1 is a schematic representation of an electric assist steering system including a torque sensor made in accordance with the present invention.

FIG. 1 illustrates an electric assist steering system 10. The system 10 includes a vehicle steering wheel 12 connected to an input shaft 14 and a pinion shaft 16 connected to a pinion gear 18. The input shaft 14 is coupled to the pinion shaft 16 through a torsion bar 20 in a manner well known in the art. The torsion bar 20 twists in response to torque applied to the vehicle steering wheel 12 and thereby permits relative rotation between the input shaft 14 and the pinion shaft 16. Stops, described below, limit the amount of relative rotation between the input shaft 14 and the pinion shaft 16.

Typically, the pinion gear 18 has a set of helical teeth (not shown) which meshingly engage a set of straight cut gear teeth (not shown) on a linear steering member or rack 22. The rack 22 is coupled to vehicle steerable wheels 24 and 26 through a conventional steering linkage. The pinion gear 18 and the rack 22 collectively form a rack and pinion gear set. When the steering wheel 12 is turned, the rack and pinion gear set converts the rotary motion of the steering wheel into linear motion of the rack 22. As the rack 22 moves linearly, the steerable wheels 24 and 26 pivot about their associated steering axis and the vehicle is steered.

An electric assist motor 28 is drivingly connected with the rack 22 through a suitable drive arrangement, e.g., ball nut. When the electric motor 28 is energized, it provides steering assist to aid in steering movement of the rack 22 and, in turn, steering of the vehicle's steerable wheels 24 and 26. Preferably, the electric assist motor 28 is a variable reluctance motor, although other motors, such as a brushless DC motor, could be used. A variable reluctance motor is preferred because of its relatively small size, low friction, and high torque-to-inertia ratio.

A torque sensing apparatus 30, in accordance with the present invention, is operatively connected across the input shaft 14 and the pinion shaft 16. The torque sensing apparatus 30 provides one or more electrical signals 34 to an electronic control unit (ECU) 36 indicative of the relative rotational position between the input shaft 14 and pinion shaft 16. The torque sensor 30, in accordance with the present invention, is comprised of a plurality of torque sensors 31. Each torque sensor 31 is comprised of separate torque sensor elements 32 and 33. One torque sensor element 33 of each torque sensor 31 is operatively connected to the input shaft 14. Another torque sensor element 32 of each torque sensor 31 is connected to pinion shaft 16. The associated first and second torque sensor elements 33 and 32 of each one of the torque sensors 31 are located operatively adjacent each other and movable relative to each other commensurate with the relative rotational movement between the input shaft 14 and pinion shaft 16.

As mentioned, each of the associated first and second torque sensor elements 33 and 32 form one of the plurality of separate torque sensors 31. In accordance with a preferred embodiment, the torque sensor 30 is comprised of four circumferentially spaced torque sensors 31. The torque sensor signals 34 comprise, in the preferred embodiment, four separate torque sensor signals, one from each torque sensor 31. The output of each torque sensor 31 is indicative of the relative rotational movement between associated sensor elements 32 and 33 of each torque sensor 31 of the torque sensor 30 which is, in turn, indicative of the twist of the torsion bar 20. Accordingly, the torque sensor signals 34 each have an electrical characteristic (e.g., amplitude, frequency, pulse, and/or width) indicative of the amount of steering torque applied to the steering wheel 12 by the vehicle operator.

Preferably, the ECU 36 is a microcomputer having memory and being programmed to control the operation of the electric assist motor 28 in response to, at least, the applied steering torque signal 34. Alternatively, the ECU 36 may be formed of an integrated circuit, a plurality of discrete electrical components, or a combination of integrated circuits and discrete electrical components configured to control the electric assist motor 28 in a desired manner. A preferred manner for controlling a variable reluctance motor in an electric assist steering system is disclosed in U.S. Pat. No. 5,257,828, which is assigned to TRW Inc. It will be appreciated that other acceptable steering control schemes exist, any of which may incorporate the torque sensing apparatus 30 of the present invention.

The ECU 36 also receives signal(s) 38 from other inputs 40. Such other input sources 40 may include, for example, a vehicle speed sensor, a motor speed sensor, a module temperature sensor, a motor current feedback signal, or other input sources that may be used to control operation of the electric assist motor 28 in a desired manner.

A motor position sensor 42 is operatively connected to the motor rotor and to the motor stator, as schematically indicated by connection 43. The motor position sensor 42 provides a motor position signal 44 to the ECU 36 indicative of the instantaneous rotor position of the electric motor 28 relative to the motor's stator. Any known motor position sensor may be used, including that disclosed in the above-mentioned '828 patent. The motor position signal 44 is provided to the ECU 36 for control of the variable reluctance electric motor 28. It will be appreciated that if a different type of electric assist motor is used, the motor position sensor 42 may or may not be necessary for the control of the motor. It is also known in the art of motor controls that motor position could be determined without use of a separate sensor but could be determined by measurement of other motor operating parameters. Such an arrangement is also useful in an electric assist steering system having the torque sensor of the present invention.

In response to the motor position signal 44, the signal(s) 38 from the other sensors 40, and the torque sensor signals 34, the ECU 36 provides a torque command signal 46 to a motor controller 48. The motor controller 48 controls the energization of the motor 28 in response to the torque command signal 46. The ECU 36 and the motor controller 48 also preferably control steering damping in response to motor rotor speed determined from the motor position sensor signal 44. It will be appreciated that, as shown, the motor controller 48 may be a separate module connected with the ECU 36. Alternatively, the motor controller 48 may be part of the ECU 36. The control algorithm performed by the ECU 36 and controller 48 in response to sensor signals can be any known control algorithm in the art. Such acceptable control arrangements are shown in the above-mentioned '828 patent. Other control arrangements are disclosed in U.S. Pat. No. 5,473,231, U.S. Pat. No. 5,475,289, U.S. Pat. No. 5,504,403, U.S. Pat. No. 5,568,389, U.S. Pat. No. 5,263,409 or U.S. Pat. No. 5,743,351. Any of these control arrangements or combination of control arrangements could be used in combination with the torque sensor in accordance with the present invention.

The motor controller 48 provides an output signals 50 to a power switch module 52. The power switch module 52 includes a plurality of power switches. The plurality of switches are arranged and configured to provide a desired amount of electrical current to the electric assist motor 28 in response to the motor control signal 50. The power switches of module 52, for example, may be pulse-width-modulated in a suitable manner in response to the motor control signals 50 so as to energize the electric motor 28. The electrical energy supplied to the motor 28 is controlled so as to control the amount of steering assist provided by the motor 28 in a manner known in the art.

Figure 2:
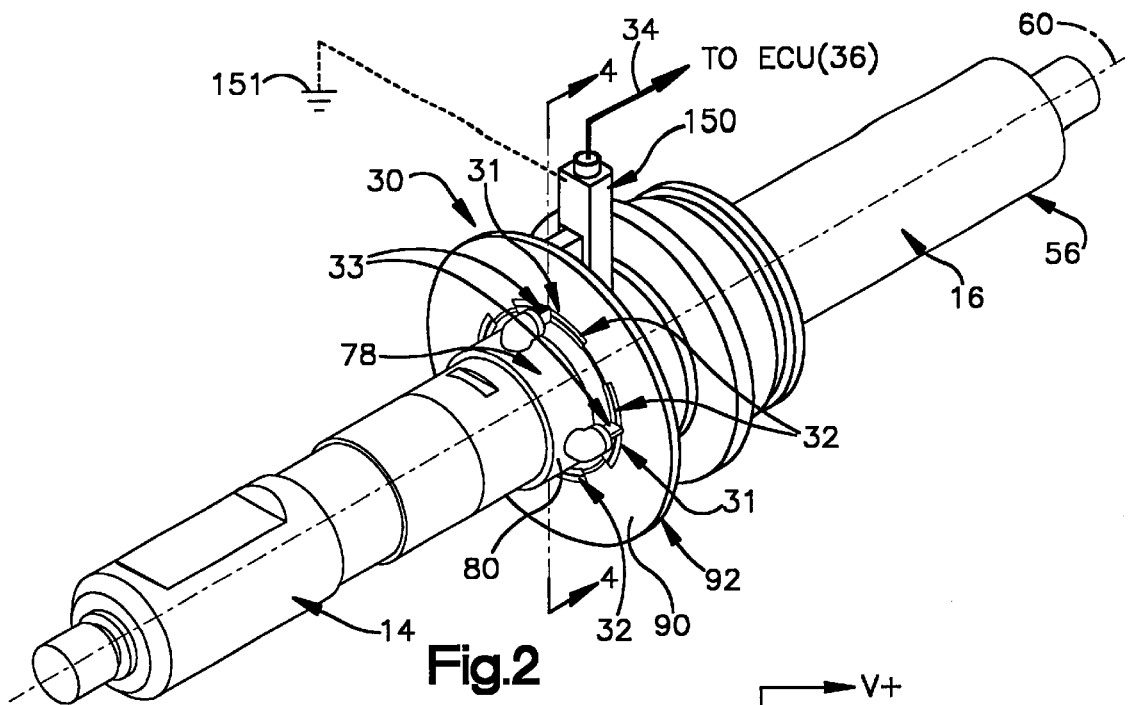
FIG. 2 is an isometric view of part of the steering system of FIG. 1 including the torque sensor.

FIG. 2 illustrates a portion of a steering column 56 having a central axis 60 extending longitudinally through the center of the steering column 56. The steering column 56 also includes the torque sensor 30 made in accordance with a preferred embodiment of the present invention. As stated above, the torque sensor 30 includes, when assembled, a plurality of adjacent first and second torque sensor elements 33 and 32 forming a plurality of sensors 31. In accordance with this preferred embodiment, four torque sensors 31 are circumferentially spaced around the steering column 56.

The sensor elements 32 and 33 are respectively secured to the pinion shaft 16 and the input shaft 14. Those skilled in the art will appreciate that elements 33 and 32 could be respectively secured to the shafts 16 and 14. The first and second sensor elements 33 and 32 are moveable relative to each other commensurate with relative rotation between the shafts 14 and 16 to provide a signal indicative of relative rotational position of the shafts about the central axis 60. Since a torsion bar operatively connects shaft 14 to shaft 16, the amount of relative rotation between 14 and 16 is indicative of the applied steering torque.

The parts 32 of the torque sensor 30 include a set of sensor parts 62, 64, 66, and 68. The sensor parts 62, 64, 66, and 68 are connected with the pinion shaft 16. Preferably, the sensor parts 62, 64, 66, and 68 are variable resistance elements.

The parts 33 of the torque sensor 30 are formed of a set of sensor parts 70, 72, 74, and 76 which are associated with the sensor parts 62, 64, 66, and 68, respectively. Preferably, each of the sensor parts 70, 72, 74, and 76 is a contacting element, such as a finger, a wiper, or a brush, that slidably contacts a respective resistance element 62, 64, 66, and 68.

It will be understood appreciated that, in accordance with the present invention, the set of sensor parts 70, 72, 74, and 76 need not actually contact a corresponding sensor parts 62, 64, 66, and 68 if a different type of sensor is used. For example, parts of the sensors might be formed of magnets and Hall-effect sensors or other non-contacting types of rotary position sensor devices associated with the input and pinion shafts 14 and 16.

In order to simplify the following description of a preferred embodiment of the torque sensing apparatus 30, the sensor parts 62, 64, 66, and 68 are hereinafter referred to as resistance elements 62, 64, 66, and 68 and corresponding sensor parts 70, 72, 74, and 76 are referred to as wipers 70, 72, 74, and 76. It will be appreciated that the present invention is not limited to this preferred embodiment.

Figure 3:
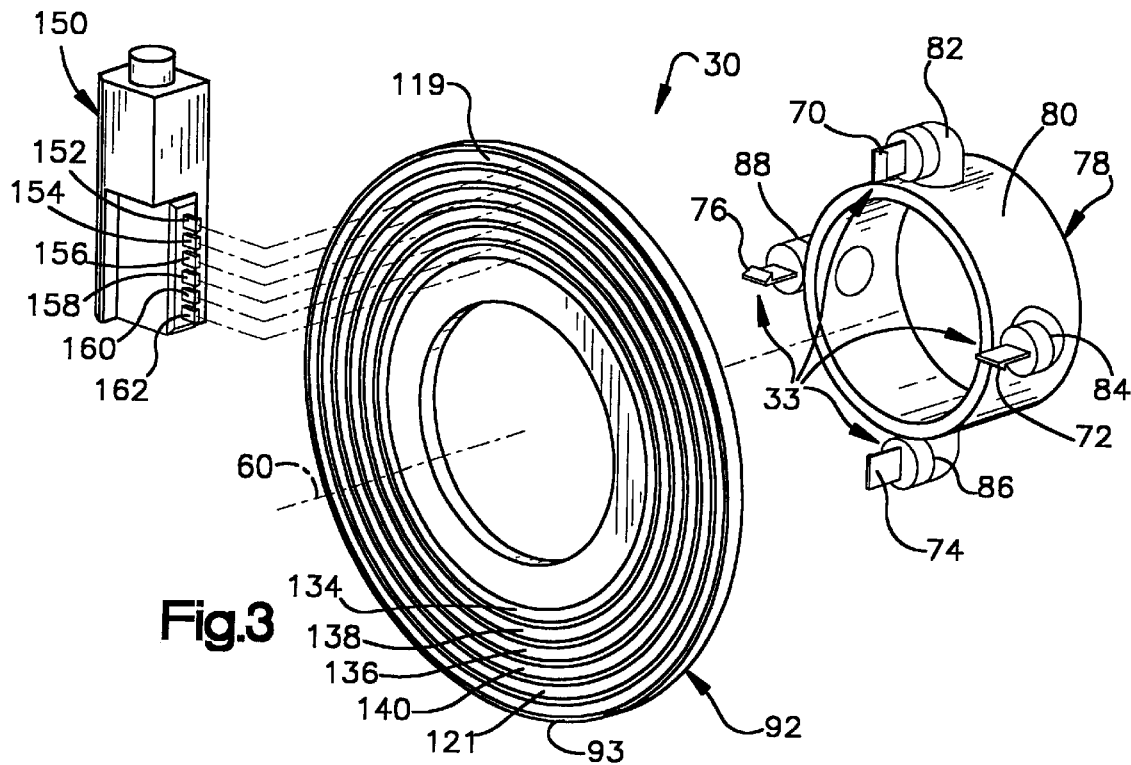
FIG. 3 is an exploded view of the torque sensor apparatus shown in FIG. 2 in accordance with a preferred embodiment of the present invention.
Figure 4:
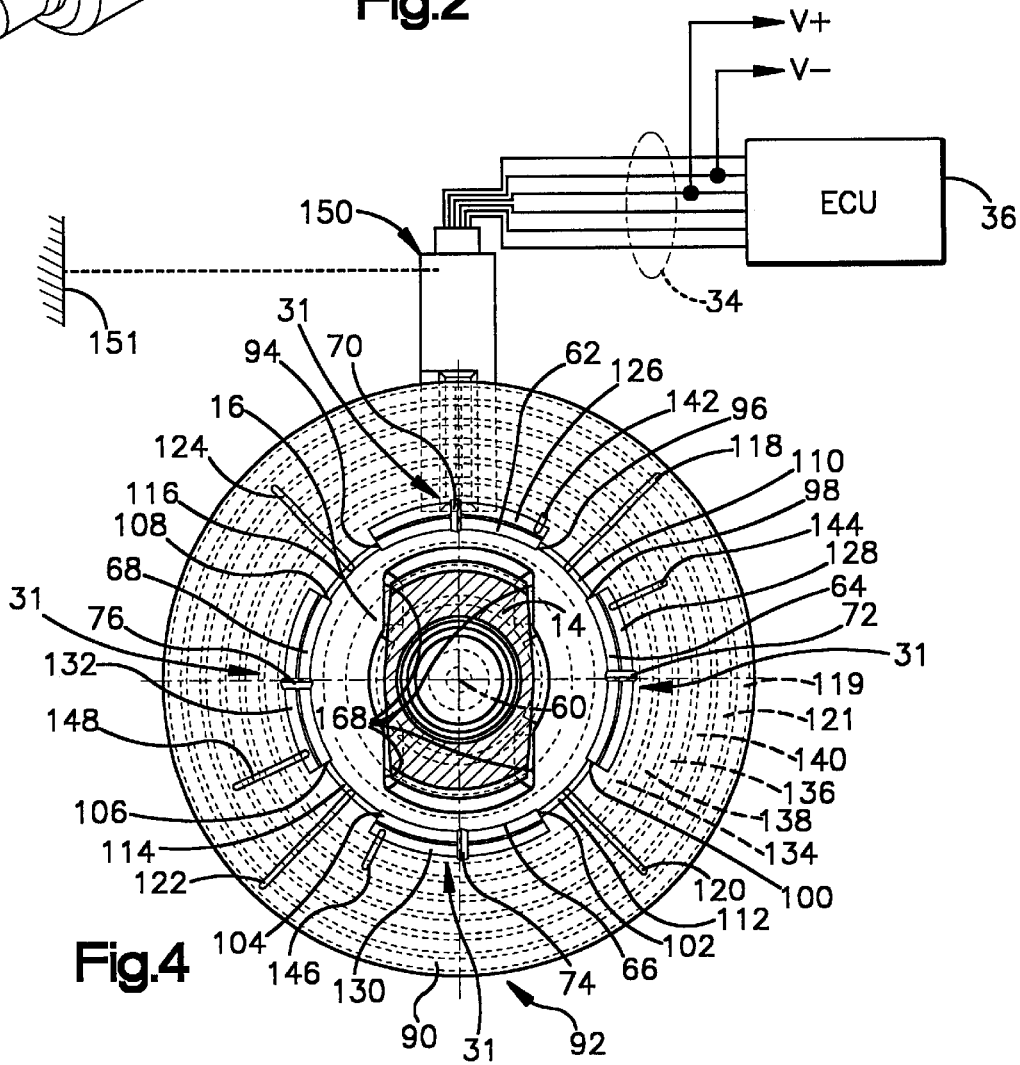
FIG. 4 is a schematic sectional view taken along line 4—4 of FIG. 2.
Figure 5:
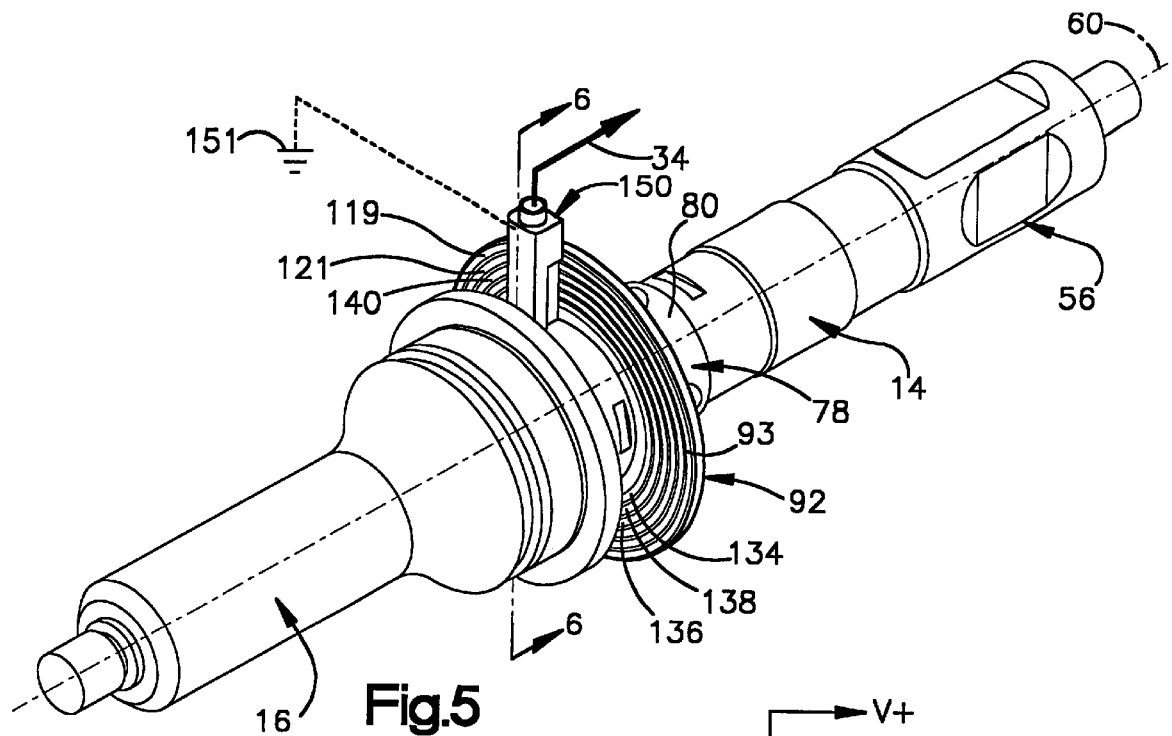
FIG. 5 is an isometric view, similar to FIG. 2 at a different angle, illustrating part of the steering system of FIG. 1.

Referring to FIGS. 3 and 4, each wiper 70, 72, 74, and 76 slidably contacts its corresponding resistance element 62, 64, 66, and 68 to provide an output signal having an electrical characteristic that varies as a function of the relative position between each wiper and its corresponding resistance element. The sliding contact between each wiper 70, 72, 74, and 76 and its associated resistance element 62, 64, 66, and 68 provides a variable resistance value which varies according to the relative position between the respective wipers and resistance elements.

As mentioned above, each of the wipers 70, 72, 74, and 76 may be fixed to either the input shaft 14 or the pinion shaft 16. Referring to the preferred embodiment of FIGS. 2–5, the wipers 70, 72, 74, and 76 are fixed relative to the input shaft 14 by a wiper assembly 78. The wiper assembly 78 is formed of a hollow cylindrical body portion 80 that is disposed concentrically about the input shaft 14. The wiper assembly 78 includes two pairs of diametrically opposed support arms 82, 86 and 84, 88 which extend radially outwardly from the cylindrical body portion 80. The support arms 82, 84 86, and 88 are circumferentially spaced around the body portion 80 so that each support is at ±90° relative to adjacent support arms as viewed along the central axis 60. Each support arm 82, 84, 86, and 88 supports a respective wiper 70, 72, 74, and 76. Each of the wipers 70, 72, 74, and 76 extend axially from its associated support arm 82, 84, 86, and 88, respectively, to a location beyond the cylindrical body portion 80.

Preferably, each resistance element 62, 64, 66, and 68 is formed of a predetermined length of a resistive material mounted to a surface 90 of a disk 92 made from a non-conductive material. In this embodiment, the disk 92 is fixed to the output shaft 16 so that it rotates commensurate with the output shaft. The resistance elements 62, 64, 66, and 68 are spaced radially from the central axis 60. Preferably, the resistive elements 62, 64, 66, and 68 are formed of circumferential arcs of the resistive material and circumferentially spaced substantially equal radial distances about the axis 60. Like the wipers 70, 72, 74, and 76, each pair of resistance elements 62, 66, and 64, 68 is substantially diametrically opposed relative to the central axis 60. The center of each of the resistance elements 62, 64, 66, and 68 are spaced approximately ±90° from the center of the adjacent resistance strips.

The resistance elements 62, 64, 66, and 68 may be formed of any suitable resistance material, such as a variable resistive strip. In order to increase the wear life of the torque sensing apparatus 30, the resistance material preferably is in the form of a polymer film resistive strip. In addition, wear of contacting parts may be further reduced by rounding or blunting the ends of the individual wipers 70, 72, 74, and 76.

It will be appreciated that, in order to provide for the relative movement between the first and second parts 33 and 32 of the torque sensing apparatus 30 in response to relative movement between the input and pinion shafts 14 and 16, respectively, each of first and second parts 33 and 32 simply needs to be operatively associated with a different one of the input and pinion shafts. That is, the particular supporting assembly and mounting means for the first and second parts 33 and 32, is a matter of design choice. The particular supporting assembly and mounting means will depend on several factors, including the type and configuration of the respective first and second parts 33 and 32 of the torque sensing apparatus 30.

As shown in FIGS. 4 and 8, the resistance elements 62, 64, 66, and 68 preferably are disposed on one surface 90 of the disk 92. As mentioned, the disk substrate 92 is formed of a non-conductive material, such as conventional PC board material. The disk 92 is fixed in a suitable manner to one of the input shaft 14 or the pinion shaft 16. In the preferred embodiment, the disk 92 is fixed relative to the pinion shaft 16. The disk 92 preferably has first and second generally planar opposed surfaces 90 and 93. The disk 92 also has a central aperture that circumscribes and is secured coaxially with the pinion shaft 16.

As illustrated in FIGS. 4 and 8, each variable resistance element 62, 64, 66, and 68 has a respective pair of spaced apart end terminals 94 and 96, 98 and 100, 102 and 104, and 106 and 108. Preferably, adjacent end terminals 96 and 98, 100 and 102, 104 and 106, and 108 and 94 are electrically connected to the same voltage potential, either V+ or V−. In the preferred embodiment of FIG. 4, end terminals 96, 98 and diametrically opposed end terminals 104 and 106 are electrically connected with V−. Similarly, end terminals 94 and 108 and diametrically opposed end terminals 100 and 102 are electrically connected with V+. This results in alternating voltage potentials V+ and V− connected between each adjacent pair of resistance elements 62 and 64, 64 and 66, 66 and 68, and 68 and 62.

Such electrical connections are preferably formed by electrically connecting the adjacent end terminals 96 and 98, 100 and 102, 104 and 106, and 108 and 94 with a strip of an electrically conductive material 110, 112, 114 and 116, respectively. Thus, the strips 110 and 114 are electrically connected to V−, while strips 112 and 116 are electrically connected to V+. Preferably, the conductive strips 110, 112, 114, and 116 are formed of circumferentially extending strips disposed on the surface 90 of the disk 92 and spaced radially from the axis 60. The conductive strips 110, 112, 114, and 116 are positioned approximately the same radial distance from the axis 60 as each of the resistance elements 62, 64, 66, and 68. Preferably, the conductive strips 110, 112, 114, and 116 are electrically connected to their respective voltage potentials through an electrically conductive feed-through element 118, 120, 122 and 124. The feed through elements 118, 120, 122, and 124 extend radially outwardly from the respective conductive strips 110, 112, 114, and 116 on the side 90 of the disk. The other ends of the strips 110, 112, 114, and 116 extend through the disk 92 to an associated conductive ring on the opposite side 93.

Preferably, the feed-through elements 118 and 122 are electrically connected to a conducting ring 119 located on other surface 93 of the disk 92. Similarly, feed-through elements 120 and 124 are electrically connected to a conducting ring 121 also disposed on the other surface 93 of the disk 92. Conducting ring 119 is provided with voltage potential V− and conducting ring 121 with voltage potential V+.

Each wiper 70, 72, 74, and 76 detects a voltage potential $V_{62}$, $V_{64}$, $V_{66}$, and $V_{68}$ according to its contact point along its associated resistance element 62, 64, 66, and 68. Each detected voltage potential $V_{62}$, $V_{64}$, $V_{66}$, and $V_{68}$ is indicative of the relative rotational position between each wiper 70, 72, 74, and 76 and its associated resistance element 62, 64, 66, and 68. Therefore, when the torque sensing apparatus 30 is connected to the input shaft 14 and pinion shaft 16, as described herein, the detected voltages $V_{62}$, $V_{64}$, $V_{66}$, and $V_{68}$ are indicative of the applied steering torque.

The electrical signals $V_{62}$, $V_{64}$, $V_{66}$, and $V_{68}$ detected by the respective wipers 70, 72, 74, and 76 as well as the V+ and V− signals are provided to the ECU 36 for a determination of applied steering torque. The electrical signals $V_{62}$, $V_{64}$, $V_{66}$, $V_{68}$, V+, and V− collectively define the torque sensor signal 34 described herein.

In order to facilitate the detection and communication of the voltage potentials $V_{62}$, $V_{64}$, $V_{66}$, and $V_{68}$, another circumferential arc of an electrically conducting material 126, 128, 130 and 132 preferably is disposed on the surface 90 of the disk 92 adjacent and substantially coextensive with each respective resistance element 62, 64, 66, and 68. The contacting surface of each wiper 70, 72, 74, and 76 extends in a radial direction relative to the axis 60 and slidably contacts both its associated variable resistance element 62, 64, 66, and 68 and its associated conducting element 126, 128, 130, and 132. The resistance strips are electrically isolated from their associated conductive strips except through the electrical connection provided by the associated wiper 70, 72, 74 and 78. Therefore, the voltage at the conducting elements are equal to the voltage of the wiper.

It is to be understood and appreciated that, rather than using the adjacent conducting elements 126, 128, 130, and 132 as a means for providing the detected voltage to the ECU 36, other means could be used. For example, each wiper 70, 72, 74, and 76 could be directly or indirectly coupled to the ECU 36 via any suitable conducting structure. In addition, each wiper 70, 72, 74, and 76 could be configured to have more than one electrically conducting finger that communicates the voltage potentials $V_{62}$, $V_{64}$, $V_{66}$, and $V_{68}$ to appropriate torque determining circuitry, such as the ECU 36.

Because in the preferred embodiment each wiper 70, 72, 74, and 76 slidably contacts a respective resistance element 62, 64, 66, and 68 between its end terminals 94 and 96, 98 and 100, 102 and 104, and 106 and 108, the voltage potentials $V_{62}$, $V_{64}$, $V_{66}$, and $V_{68}$ vary as a function of the relative contact position of the wipers between the corresponding end terminals. The relative contact position corresponds to the relative position between the input shaft 14 and the pinion shaft 16 to which the sensor elements are connected. The sensor apparatus 30 is, in accordance with this embodiment, effectively formed of four potentiometers that provide a voltage value functionally related to the applied steering torque.

The voltage potential $V_{62}$, $V_{64}$, $V_{66}$, and $V_{68}$ detected by the wipers 70, 72, 74, and 76 are provided electrically to the adjacent conducting elements 126, 128, 130, and 132, respectively. The conducting elements 126, 128, 130, and 132 are electrically connected with an electrically conducting ring 134, 136, 138, and 140, respectively. Preferably, the conducting rings 134, 136, 138, and 140 are in the form of concentric conducting rings disposed on the second surface 93 of the disk 92. Each of the conducting elements 126, 128, 130, and 132 is connected to its corresponding conducting rings 134, 136, 138, and 140 through an electrically conductive feed-through element 142, 144, 146, and 148, respectively. The feed-through elements 142, 144, 146, and 148 are substantially identical to the feed through elements 118, 120, 122, and 124 described above.

Each ring 134, 136, 138, and 140 provides a connection to the voltage potential present at its associated wiper 70, 72, 74, and 76, i.e., $V_{62}$, $V_{64}$, $V_{66}$, and $V_{68}$, respectively. Accordingly, the voltage potential of each ring 134, 136, 138, and 140 varies as a function of the relative position of each wiper 70, 72, 74, and 76 along its respective resistance element 62, 64, 66, and 68.

As shown in the preferred embodiment of FIGS. 3–8, the voltage potential $V_{62}$, $V_{64}$, $V_{66}$, $V_{68}$, V−, and V+ of each respective concentric ring 134, 136, 138, 140, 119, and 121 is provided to the ECU 36 as signal 34. The ECU 36 monitors the respective voltages $V_{62}$, $V_{64}$, $V_{66}$, $V_{68}$, V−, and V+ in order to determine the relative position of the wipers 70, 72, 74, and 76 on associated variable resistance elements 62, 64, 66, and 68. Recall, that relative movement between the wipers 70, 72, 74, and 76 along their associated resistance elements 62, 64, 66, and 68 corresponds to relative rotational movement between the input shaft 14 and the pinion shaft 16, which, in turn, provides an indication of applied steering torque. The ECU 36 determines the magnitude and direction of applied steering torque in response to these electrical signals 34, such as through a look-up table or mathematical determination.

The input shaft 14 and pinion shaft 16 are part of a steering column 151 assembly rotatably mounted in the vehicle, in a manner known in the art. A stator connector assembly 150 is oriented adjacent and substantially parallel to the second surface 93 of the disk 92. The stator assembly extends radially relative to the central axis 60 and mounted to a stationary portion of the housing 151 which preferably does not rotate with the shafts 14 and 15, nor with the disk 92. A plurality of fingers 152, 154, 156, 158, 160 and 162 extend axially from the stator connector member 150 and slidably contact corresponding concentric rings 119, 121, 140, 136, 138, and 134, respectively. The fingers 152, 154, 156, 158, 160, and 162 have a width such that each finger electrically contacts only its associated conducting ring. The stator member 150 also may be fixed relative to the disk 92, so that electrical contact between the fingers 152, 154, 156, 158, 160, and 162 and their associated conducting rings 119, 121, 140, 136, 138, and 134 is maintained during rotation of the disk 92 about the axis 60. Alternatively, rather than utilize fingers 152, 154, 156, 158, 160, and 162 to monitor the voltage potentials $V_{62}$, $V_{64}$, $V_{66}$, $V_{68}$, V−, and V+, other types of electrical connections could be used to detect the corresponding voltages.

The electrical signals $V_{62}$, $V_{64}$, $V_{66}$, and $V_{68}$ monitored by each respective finger 156, 158, 160, and 162 are provided to the ECU 36 as sensor signals 34. The signals V+ and V− are provided to fingers 152 and 154 from an appropriate voltage source such as the vehicle battery or a voltage regulator. The ECU 36 determines a value for an applied input torque in response to these signals 34.

The preferred embodiment of the torque sensing apparatus 30 provides two measurements of the applied input torque. Specifically, one measurement value of the applied torque is responsive to the electrical signals detected by each opposed pair of wipers 70, 74, and 72, 76. It will be appreciated that the electrical signals $V_{62}$, $V_{66}$ or $V_{64}$, $V_{68}$, provided by the pair of wipers 70, 74 or 72, 76 is sufficient for the ECU 36 to determine the applied steering torque since the ECU "knows" the values of V+ and V− and the strength of the connecting torsion bar.

For example, a torque signal $T_A$ determined from the electrical signals $V_{62}$ and $V_{66}$ provided by the respective wipers 70 and 74, may be expressed as:

$$T_A = 2V_+ - (V_{62} + V_{66}) \qquad \text{(Eq. 1)}$$

Similarly, an applied torque input signal $T_B$ for the electrical signals $V_{64}$ and $V_{68}$ detected by the respective wipers 72 and 76 may be expressed as:

$$T_B = 2V_+ - (V_{64} + V_{68}) \qquad \text{(Eq. 2)}$$

A torque sensor in a vehicle steering column may be subjected to side loading. When the vehicle tires are subjected to a substantial side load, forces through the rack and pinion could result in a side loading force within the torque sensor. This side loading could effect a variance in the applied steering torque sensor output when there was no change in the applied steering torque.

Advantageously, the arrangement of diametrically opposed sensor elements, which, in this preferred embodiment, is formed by the combination of wipers 70, 72, 74, and 76 and respective resistance elements 62, 64, 66, and 68, substantially eliminates the effects due to side loading torque on the torque sensor itself. In other words, the applied torque signals $T_A$ and $T_B$ provide an indication of the rotary applied torque responsive to the relative rotation between the input shaft 14 and the pinion shaft 16. The effects due to side loading or radial torque is compensated for or cancelled by the spatial (diametrically opposed) arrangement of sensor pairs.

When a side loading torque condition exists, there are corresponding changes in the electric signals $V_{62}$ and $V_{66}$, which changes are indicated as $\Delta V_{62}$ and $-\Delta V_{66}$. Accordingly, the applied input torque signal $T_A$ of Eq. 1 becomes:

$$T_A = 2V_+ - [(V_{62} + \Delta V_{62}) + (V_{66} - \Delta V_{66})] \qquad \text{(Eq. 3)}$$

Because of the substantially diametrically opposed spatial relationship of the resistance elements 62 and 66, $\Delta V_{62} - \Delta V_{66} \approx 0$. Therefore, variations in the signals $V_{62}$ and $V_{66}$ due to non-rotational relative movement between the input shaft 14 and the pinion shaft 16, i.e., $\Delta V_{62}$ and $-\Delta V_{66}$, substantially cancel and the applied input torque input signal $T_A$ reduces to that of Eq. 1.

Advantageously, the portions of the electrical signals $V_{62}$ and $V_{66}$ provided by diametrically opposed wipers 70 and 74, respectively, vary in an inverse relationship in response to non-rotational relative movement between the wipers 70 and 74 and their associated resistance elements 62 and 66.

Upon the occurrence of a side loading torque condition, there also are corresponding changes in the electrical signals $V_{64}$ and $V_{68}$, which changes are indicated as $\Delta V_{64}$ and $-\Delta V_{68}$. Accordingly, with side loading, the applied input torque signal $T_B$ of Eq. 2 becomes:

$$T_B = 2V_+ - [(V_{64} + \Delta V_{64}) + (V_{68} - \Delta V_{68})] \qquad \text{(Eq. 4)}$$

For the same reasons as stated above, the changes of the signals $V_{R64}$ and $V_{R68}$ due to non-rotational relative movement between the input shaft 14 and the pinion shaft 16 are substantially equal in magnitude although opposite sign, i.e., $|\Delta V_{64}| \approx |\Delta V_{68}|$. Thus, the applied torque input signal $T_B$ remains that of Eq. 2, even under side loading. Accordingly, in response to non-rotational relative movement between the wipers 72 and 76 and their associated resistance elements 64 and 68, the non-rotational components of the respective electrical signals $V6_4$ and $V_{68}$, namely $\Delta V_{64}$ and $\Delta V_{68}$, vary in an inverse relationship.

Figure 6:
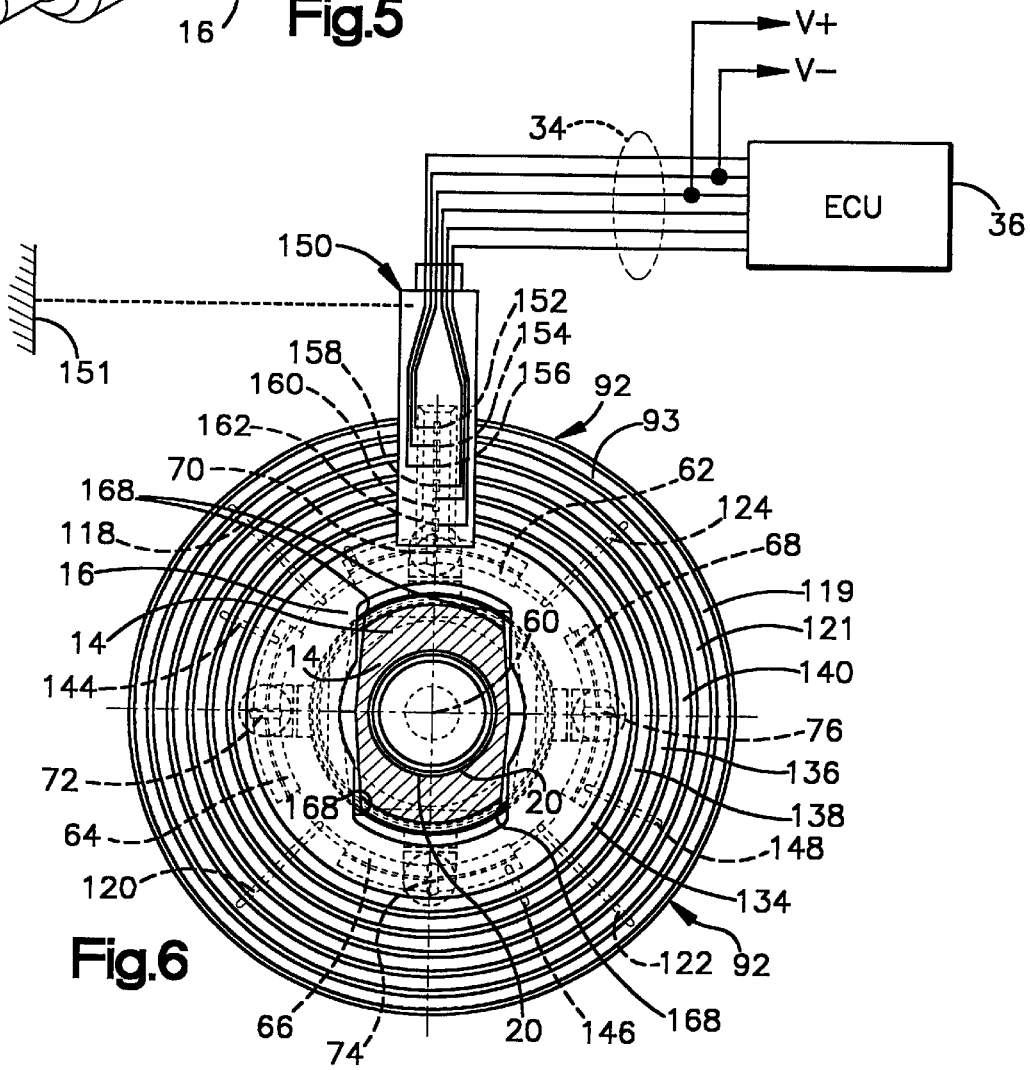
FIG. 6 is a sectional view taken along line 6—6 of FIG. 5, illustrating a first condition.

The particular orientation of the torque sensing apparatus shown in FIGS. 4 and 6 represents a zero applied steering torque condition. Each of the wipers 70, 72, 74, and 76 contacts each resistance element 62, 64, 66, and 68 substantially at the center between the respective end terminals 94 and 96, 98 and 100, 102 and 104, and 106 and 108. In accordance with one embodiment, the resistance value of the resistive elements 62, 64, 66, and 68 are substantially linear across the length of the strip. Accordingly, the zero torque voltage is equal to about ½(V+−V−), which with V− connected to ground potential (0v) is about ½V+.

FIG. 7 illustrates an applied torque condition with relative rotation between the input shaft 14 and the pinion shaft 16 in the direction of arrow 167. The maximum amount of angular rotation between the input shaft 14 and the pinion shaft 16 is, in accordance with this embodiment, approximately 4.25° about the axis 60. As stated above, the amount of relative rotation is limited by mechanical stops 168 of pinion shaft 16 which engage the input shaft 14 at maximum rotation.

It will be appreciated by those skilled in the art that the input shaft 14, however, typically would not engage the stops 168 of pinion shaft 16, as the electric assist motor 28 is controlled so as to maintain a substantially zero torque condition. A zero applied torque condition is shown in FIGS. 4 and 6. Upon the torque input signals $T_A$ and $T_B$ indicating an applied torque, the ECU 36 effects activation of the electric assist motor 28 to steerably move the wheels 24 and 26 to minimize the amount of relative rotation between the input shaft 14 and the pinion shaft 16. This results in energizing the electric motor 28 until the zero torque condition is achieved. If the input shaft 14 engages the stops 168 of pinion shaft 16, the amount of relative movement between the first and second parts 32 and 33 of the torque sensor stops 168. Any further applied steering torque results in direct mechanical force being applied by the vehicle operator. The engagement between the stops 168 and the input shaft 14 also might provide a mechanical shunt that effects energization of the motor 28 by the ECU 36.

FIG. 8 illustrates a representation of the result of a side loading torque condition, in which a non-rotational or radial torque is applied to at least one of the input shaft 14 and the pinion shaft 16. In this condition, all the wipers 70, 72, 74, and 76 are urged generally in the direction of arrow 170, which in the representation of FIG. 8 is to the left. Under normal applied steering torque conditions, all wipers will move clockwise or counterclockwise about the central axis 60 according to the applied torque. When the steering column is subjected to a side body force in a direction parallel with one set of wipers, one wiper of the other set will move in an apparent clockwise direction while the diametrically opposed wipe of that pair moves in an apparent counterclockwise direction.

For the particular side loading torque condition shown in FIG. 8, wipers 72 and 76 provide signals indicative of a zero torque condition because the side load is parallel with wipers 72, 76. Under this condition, there is no relative rotational movement about the axis 60 between the wipers 72 and 76 and the respective resistance elements 64 and 68. However, wipers 70 and 74 also have moved in the direction of the radial force 170. From the perspective of resistance element 62 relative to the axis 60, wiper 70 has moved generally counterclockwise while, from the perspective of resistance element 66 relative to the axis, wiper 74 has moved generally clockwise. Accordingly, the change in voltage potential ($\Delta V_{62}$ and $\Delta V_{66}$) as seen by the wipers 70 and 74, vary in an inverse relationship, such that, as shown in Equation 3, the changes in voltage potential $\Delta V_{62}$ and $\Delta V_{66}$ due to the non-rotational side loading torque substantially cancel.

It will be appreciated by those skilled in the art that the effects of non-rotational, side loading torque from other relative directions will cancel in a substantially similar manner, regardless of its direction. The magnitude of an offset "seen" by one sensor during a side load event will be offset by an equal but opposite offset "seen" by its associated diametrically opposed sensor. For example, any offset seen by sensor elements 62, 70 during a side load event will be offset by the offset experienced by sensor elements 66, 74.

From the above description of the invention, those skilled in the art will perceive improvements, changes and modifications. For example, the sensors disclosed were a resistive type. Other sensor types could be used, such as Hall effect sensors, capacitive sensors, etc. The diametrically opposed sensors are arranged so that side loads will result in substantially equal but opposite effects on the sensors. Such improvements, changes and modifications within the skill of the art are intended to be covered by the appended claims.

Having described the invention, the following is claimed:

1. A torque sensing apparatus for an electric assist steering system, said apparatus comprising:

an input shaft having a central axis extending longitudinally through said input shaft;

an output shaft substantially coaxial with said input shaft and, upon application of an applied torque, said input shaft being rotatable relative to said output shaft about the central axis;

a torsion member connected to said input shaft and said output shaft to resist relative rotation between the input shaft and the output shaft;

a first sensor element spaced from the central axis and operatively connected with said input shaft and said output shaft, said first sensor element being operative to provide a first output signal that varies as a function of relative movement between said input shaft and said output shaft; and a second sensor element operatively connected with said input shaft and said output shaft, said second sensor element being spaced from the central axis and substantially diametrically opposed from said first sensor element, said second sensor element being operative to provide a second output signal that varies as a function of the relative movement between said input shaft and said output shaft, said first and second output signals varying in an inverse relationship in response to non-rotational relative movement between said input shaft and said output shaft.

2. The apparatus of claim 1 further comprising a controller electrically connected with said first and second output signals, said controller being operative to determine a torque value as a function of said first and second output signals, such that variations in said first output signal corresponding to non-rotational relative movement between said input shaft and output shaft substantially cancel variations in said second output signal corresponding to non-rotational relative movement between said input shaft and output shaft.

3. The apparatus of claim 1 wherein said first and second sensor elements respectively comprise first and second potentiometers, each having a resistance value functionally related to relative rotational movement between said input shaft and said output shaft.

4. The apparatus of claim 3 wherein said first potentiometer further includes a circumferentially extending first strip of resistance material spaced radially from the central axis and said second potentiometer further includes a circumferentially extending second strip of resistance material spaced radially from the central axis and substantially diametrically opposed from said resistance material of said first potentiometer, said first and second strips of resistance material being connected to said output shaft, said first and second strips of resistance material being associated with respective first and second wipers, said first and second wipers being connected to said input shaft and slidably contacting said first and second strips of resistance material, respectively, such that applied torque results in relative movement between said first wiper and said first strip of resistance material, and between said second wiper and said second strip of resistance material.

5. The apparatus of claim 1 further comprising a substantially disc-shaped substrate substantially circumscribes one of said input shaft and said output shaft, said first and second sensor elements further including respective first and second resistive parts disposed on said substrate.

6. The apparatus of claim 5 wherein said substrate is operatively connected to one of said input shaft and said output shaft, said first and second sensor elements further including respective first and second wiper parts connected to one of said input shaft and said output shaft which is free from connection to said substrate, said first and second wiper parts slidably engaging said first and second resistive parts, respectively, whereby relative movement between the input shaft and output shaft results in relative movement between said first wiper part and said first resistive part and between said second wiper and said second resistive part.

7. The apparatus of claim 1 further comprising:

a third sensor element operatively connected with said input shaft and said output shaft, said third sensor element being spaced radially from the central axis generally intermediate said first and second sensor elements, said third sensor element being operative to provide a third output signal that varies as a function of the relative movement between said input shaft and said output shaft;

a fourth sensor element operatively connected with said input shaft and said output shaft, said fourth sensor element being spaced radially from the central axis generally intermediate said first and second sensor elements and substantially diametrically opposed from said third sensor element, said fourth sensor element being operative to provide a fourth output signal that varies as a function of the relative movement between said input shaft and said output shaft, said third and fourth output signals varying in an inverse relationship in response to non-rotational relative movement between said input shaft and said output shaft.

8. The apparatus of claim 7 wherein each of said first, second, third, and fourth sensor elements respectively is a sensor potentiometer.

9. The apparatus of claim 1, wherein said to non-rotational relative movement is movement caused by side loading.

10. A torque sensing apparatus comprising:
a first sensor element having a first part connectable to an input shaft and a second part adjacent and rotatable relative to said first part of said first sensor element and connectable with an output shaft, at least one of said first and second parts of said first sensor element being operative to receive an electrical signal from another of said first and second parts of said first sensor element, the electrical signal varying as a function of relative position between said first and second parts of said first sensor element; and
a second sensor element having a first part connectable to the input shaft and a second part adjacent and rotatable relative to said first part of said second sensor element and connectable with the output shaft, said second sensor element being spaced from and substantially diametrically opposed from said first sensor element relative to a central axis extending between said first and second sensor elements, at least one of said first and second parts of said second sensor element being operative to receive an electrical signal from another of said first and second parts of said second sensor element, the electrical signal varying as a function of relative position between said first part and said second part of said second sensor element, the electrical signals of said first and second sensor elements varying in an inverse relationship in response to non-rotational relative movement between said first and second parts of said first sensor element and said first and second parts of said second sensor element.

11. The apparatus of claim 10 further comprising a torque determining means electrically connected to said first and second sensor elements, said torque determining means being operative to provide a torque signal indicative of an applied torque about the central axis in response to the electrical signals of said first and second sensor elements, said torque determining means combining the output signals of said first and second sensor elements so that portions of the output signals corresponding to non-rotational relative movement between said first and second parts of said first sensor element and said first and second parts of said second sensor element substantially cancel.

12. The apparatus of claim 10 wherein said first and second parts of each of said sensor elements form a sensor potentiometer.

13. The apparatus of claim 12 wherein said potentiometer of said first sensor element further includes a strip of a resistance material spaced radially from the central axis and said potentiometer of said second sensor element further includes a strip of a resistance material spaced radially from the central axis and substantially diametrically opposed from said resistance material of said first sensor element.

14. The apparatus of claim 10 further comprising a disk shaped substrate having a substantially planar surface oriented substantially transverse to the central axis, each first part of said first and second sensor elements further including a first electrically resistive part disposed on a first surface of said substrate.

15. The apparatus of claim 14 wherein said substrate is operatively connectable to one of an input shaft and an output shaft, each of said first and second sensor elements further including a wiper member connectable to one of the input shaft and the output shaft which is free from connection to said substrate, said wiper members slidably contacting a corresponding one of said resistive parts, whereby relative rotational movement between each wiper member and the corresponding said resistive part of said first and second sensor elements results in a change in the respective electrical signals of said first and second sensor elements.

16. The apparatus of claim 15 further comprising first and second conductive strips disposed on a second surface of said substrate, each of said first and second conductive strips being electrically connected with one of said wiper members and, thereby operative to provide the respective electrical signals of said first and second sensor elements.

17. The apparatus of claim 10 further comprising:
a third sensor element having a first part connectable to the input shaft and a second part adjacent and moveable relative to said first part of said third sensor element and connectable to the output shaft, said third sensor element being spaced radially from the central axis generally intermediate said first and second sensor elements, said third sensor element being operative to provide an electrical signal that varies as a function of the relative position between said first and second parts of said third sensor element;
a fourth sensor element, having a first part connectable to the input shaft and a second part adjacent and moveable relative to said first part of said fourth sensor element and connectable to the output shaft, said fourth sensor element being spaced radially from the central axis generally intermediate said first and second sensor elements and substantially diametrically opposed from said third sensor element, said fourth sensor element being operative to provide an electrical signal that varies as a function of the relative position between said first part and said second part of said fourth sensor element, the electrical signals of said third and fourth sensor elements varying in an inverse relationship in response to non-rotational relative movement between said first and second parts of said third sensor element and said first and second parts of said fourth sensor element.

18. The apparatus of claim 17 wherein each of said first, second, third, and fourth sensor elements respectively is a sensor potentiometer.

19. The apparatus of claim 10, wherein said to non-rotational relative movement is movement caused by side loading.

20. A sensor assembly comprising:
a substantially disk-shaped substrate having a central axis extending therethrough, said substrate being operatively connectable to one of an input shaft and an output shaft;
a first sensor element having a first part connected with said substrate and a second part adjacent and rotatable relative to said first part of said first sensor element, said second part of said first sensor element being connectable to one of the input shaft and the output shaft which is free from being operatively connectable to said substrate, said first sensor element being operative to provide an electrical signal which varies as a function of the relative position between said first and second parts of said first sensor element; and a second sensor element having a first part connected with said substrate and a second part adjacent and rotatable relative to said first part of said second sensor element, said second part of said second sensor element also being connectable to one of the input shaft and the output shaft which is free from being operatively connectable to said substrate, said second sensor element being substantially diametrically opposed from said first sensor element, said second sensor element being operative to provide an electrical signal which varies as a function of the relative position between said first and second parts of said second sensor element, the electrical signals of said first and second sensor elements varying in an inverse relationship in response to non-rotational relative movement between said first parts of said first and second sensor elements and the respective said second parts of said first and second sensor elements.

21. The apparatus of claim 20 further comprising torque determining means electrically connected with said first and second sensor elements, said torque determining means, in response to the electrical signals of said first and second sensor elements, being operative to determine a torque value indicative of a torque applied about the central axis, in which variations in the electrical signal of said first sensor element corresponding to non-rotational relative movement between said first and second parts of said first sensor element substantially cancel by variations in the electrical signal of said second sensor element corresponding to non-rotational relative movement between said first and second parts of said second sensor element.

22. The apparatus of claim 20 wherein each of said first and second sensor elements is a potentiometer.

23. The apparatus of claim 22 wherein each of said first parts of said first and second sensor elements includes a resistance element, said resistance elements being disposed on a first surface of said substrate in a substantially diametrically opposed relationship relative to the central axis.

24. The apparatus of claim 23 wherein each of said resistance elements further include spaced apart and diametrically opposed first and second end terminals, said first end terminals of said resistance elements being electrically connectable to a first voltage potential, said second end terminals of said resistance elements being electrically connectable to a second voltage potential which is different from the first voltage potential.

25. The apparatus of claim 24 wherein each of said second parts of said first and second sensor elements include a wiper which slidably contacts a respective one of said resistance elements and is operative to move between the first and second end terminals of the respective one of said resistance elements.

26. The apparatus of claim 25 further comprising a plurality of electrically conductive rings disposed on a second surface of said substrate, each of said plurality of rings being electrically connected with one of the second parts of said first and second sensor elements.

27. The apparatus of claim 26 further comprising a plurality of fingers, each of said fingers electrically contacting one of said plurality of rings to detect the electrical signals present at said first and second sensor elements.

28. The apparatus of claim 20, wherein said to non-rotational relative movement is movement caused by side loading.

29. A torque sensing apparatus for an electric assist steering system, said apparatus comprising:

an input shaft having a central axis extending longitudinally through said input shaft;

an output shaft substantially coaxial with said input shaft, said input shaft being rotatable relative to said output shaft about the central axis;

a torsion member connected to said input shaft and said output shaft to resist relative rotation between the input shaft and the output shaft; and a torsion sensor adapted to provide an indication of relative rotational movement between said input shaft and said output shaft and to attenuate effects of side loading on said indication.

30. Apparatus as defined in claim 29, wherein said torsion sensor comprises first and second sensor elements adapted to provide respective first and second signals that vary as a function of relative movement between said input shaft and said output shaft, said first and second signals varying in a direct relationship in response to relative rotational movement between said input shaft and said output shaft, said first and second signals varying in an inverse relationship in response to side loading.

* * * * *